Feb. 17, 1953 R. R. RIEL ET AL 2,628,505
V BELT AND METHOD OF MAKING SAME
Filed Feb. 12, 1947 4 Sheets-Sheet 1

INVENTORS
Robert R. Riel
Richard A. Claussen
BY Evans + McCoy
ATTORNEYS

Feb. 17, 1953 R. R. RIEL ET AL 2,628,505
V BELT AND METHOD OF MAKING SAME
Filed Feb. 12, 1947 4 Sheets-Sheet 3

INVENTORS
Robert R. Riel
Richard A. Claussen
BY Evans + McCoy
ATTORNEYS

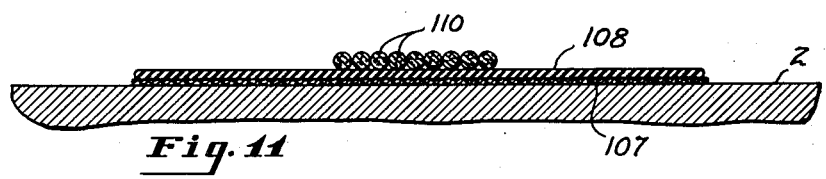
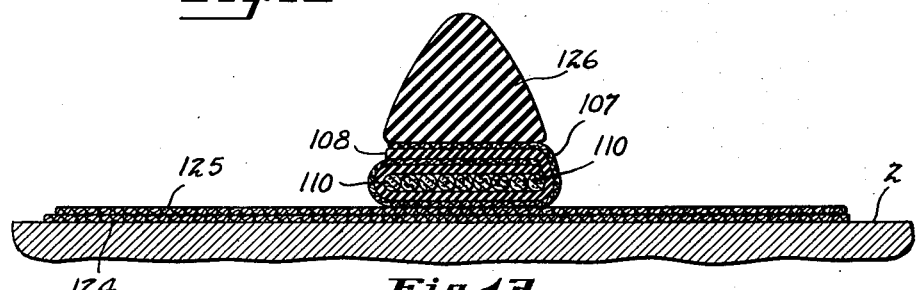
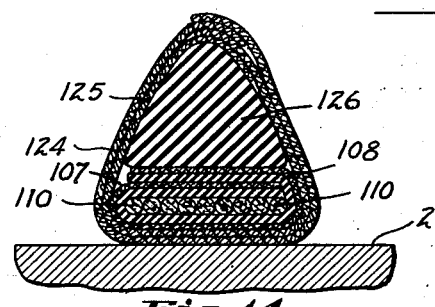
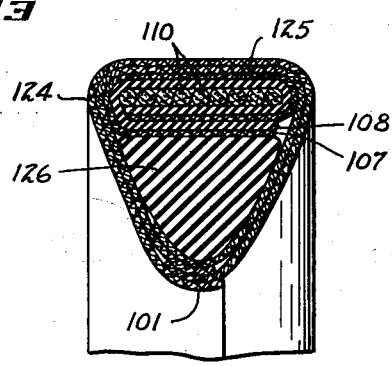
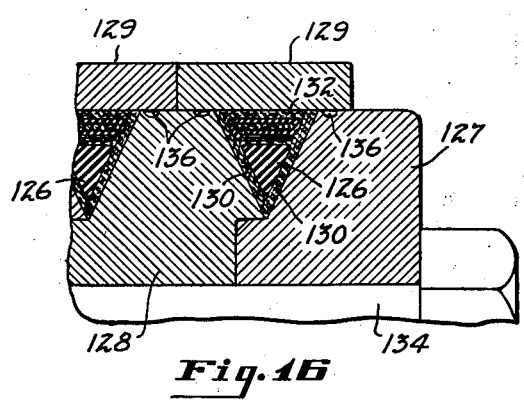
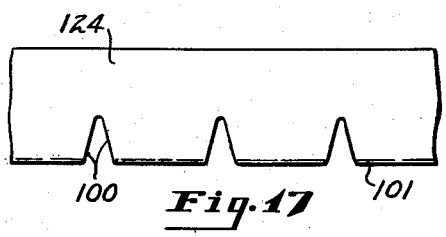
INVENTORS
Robert R. Riel
Richard A. Claussen

Patented Feb. 17, 1953

2,628,505

UNITED STATES PATENT OFFICE 2,628,505

V BELT AND METHOD OF MAKING SAME

Robert R. Riel and Richard A. Claussen, Wabash, Ind., assignors to The General Tire and Rubber Company, Akron, Ohio, a corporation of Ohio Application February 12, 1947, Serial No. 727,954

16 Claims. (Cl. 74—233)

This application is a continuation-in-part of our application Serial No. 648,182, filed February 16, 1946, now abandoned, and this invention relates to belts and more particularly to reinforced belts of rubber or like material and to a method of making the same. It has for one of its objects the provision of a new and improved belt of such character.

Another object of the invention is to provide such a belt in which the reinforcing means to resist elongation of the belt in use takes the form of a continuous helical strand having the successive turns laid up in side by side relation and disposed substantially in a common plane.

Another object is to provide a V-type of belt in which annular reinforcing means, normally tensioned, is encased in a protective cover and disposed radially outwardly of an annular elastic cushion, normally compressed.

A further object of the invention is to provide a new and improved method of making a belt of the character mentioned, in which the reinforcing means and annular cushion are initially assembled in one position and thereafter reversed, the belt thus assembled being cured in reversed position. More specifically, the invention aims to provide, in a method of making a belt, for the assembled reinforcing means and cushioning means to be compressed along the sides of the belt during curing to tension the reinforcing means and produce a belt in which the reinforcing means is normally under tension and the cushion means is normally under compression. Other objects and advantages of the invention reside in certain novel features of construction, arrangement of parts and steps in the process of manufacture. They will become apparent as the detailed description of the invention proceeds. This description is made in connection with the accompanying drawings in which:

Fig. 11 is a view like Fig. 5 but showing one of the first stages in making a modified form of belt of the present invention;

Fig. 12 is a similar sectional detail showing a succeeding step in the manufacture of the modified form of belt;

Fig. 13 is a similar sectional detail showing still another step;

Fig. 14 is a similar sectional detail showing one of the final stages in making the modified form of a belt embodying the present invention;

Fig. 15 is an enlarged sectional detail showing the modified form of belt as removed from the building machine and turned inside-out ready for curing;

Figure 1:
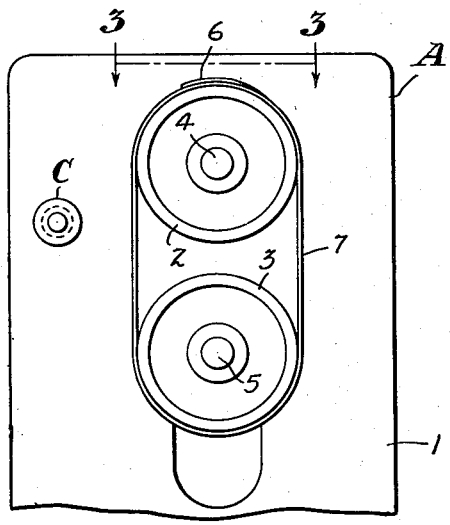
Fig. 1 is a fragmentary front elevational view, partly in diagrammatic form, of a suitable machine useful in making the belt of the present invention.

Fig. 16 is a sectional detail of a portion of a suitable multicavity mold, such as may be used in curing the modified form of belts in accordance with the present invention; and Fig. 17 is a side elevational view of a portion of the modified form of belt, the building of which is illustrated by Figs. 11 to 16, showing the transverse slots spaced along the inner periphery of the belt, which slots may be made by removing, as by grinding or cutting, spaced inner peripheral portions of the belt as taken from the mold of Fig. 16.

Referring now to the drawings by letters and numerals of reference, which indicate like parts throughout the several views, the present invention is illustrated in connection with a relatively small diameter V-type belt such as is used to drive domestic refrigerators, washing machines and automobile fans. The principles of the invention, however, may be applied with equal advantage to manufacture of larger and different types of belts.

Referring to Fig. 1, there is shown in diagrammatic form a band building machine, indicated generally at A, which includes a suitable housing or frame structure 1 in which is mounted suitable gears and driving mechanism (not shown) for actuating rotatable cylindrical drums 2 and 3 positioned outside of the housing one above the other and supported cantilever fashion by parallel horizontal shafts 4 and 5. The drums are also disposed in parallel relation to one another and the shaft 5 for the lower drum 3 is so supported that it may be raised and lowered so as to move the drum 3 toward and away from the drum 2, while maintaining the drums in parallel relation. Drive means (not shown) is provided to rotate drum 2 in either direction and at different rates of speed under control of the operator.

The particular type of band building machine, shown in the drawing, used to make the belt of the present invention does not constitute an essential part of the present invention. Although the drums are shown one above the other, they may be arranged in side-by-side relation on the same level if desired, or a band building machine of the collapsible drum type could also be used.

Although the belt making method is described as being performed on a single band building machine, it is contemplated that a series of machines may also be used so as to adapt the process to production methods in which successive steps or operations of the process are performed by one operator or several operators on a number of machines each adjusted and set up for efficiently performing one or more steps or operations of the entire process. Furthermore, it is feasible, although not entirely practical from a commercial point of view, to perform the belt building method of the present invention manually or by hand without using a band building drum or machine.

Figure 2:
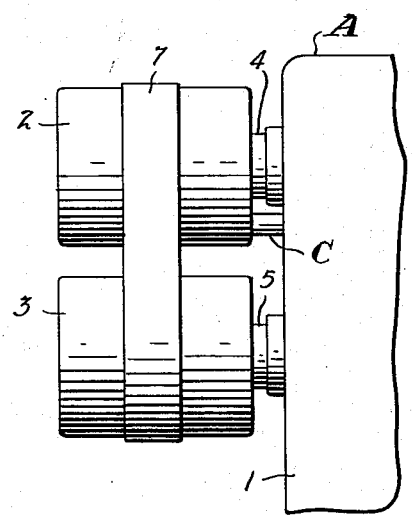
Fig. 2 is a fragmentary side elevational view, partly diagrammatic, of the machine shown in Fig. 1.
Figure 3:
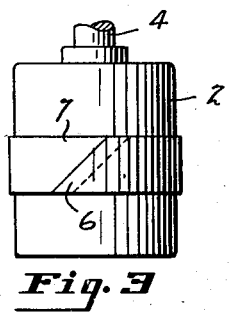
Fig. 3 is a fragmentary detail of the machine shown in Fig. 1, taken substantially on the line 3—3 of Fig. 1.
Figure 4:
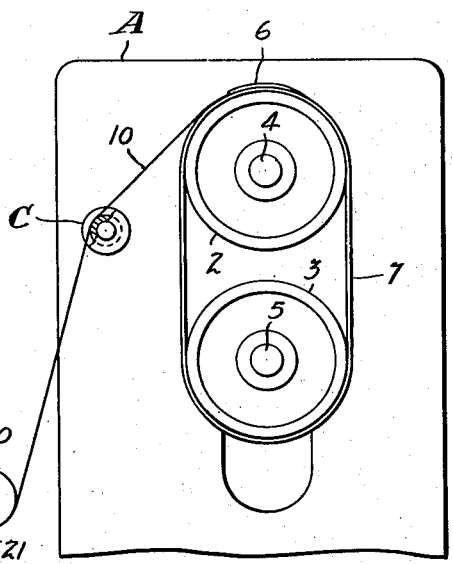
Fig. 4 is an elevational view similar to Fig. 1, showing schematically mechanism for laying up the relatively inextensible reinforcing band of the belt.
Figure 4:
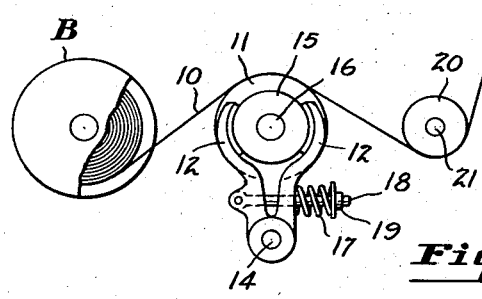

In making a V-type belt in accordance with the present invention a strip of rubber coated cord fabric material in uncured condition is fed onto and around the drums 2 and 3 to form a wrapping band 7 as shown in Fig. 2. Such fabric material can be straight or bias-cut, preferably the latter. The ends of the strip of rubber, cord containing, sheet material used to form this band may be overlapped as shown at 6 in Fig. 3 and by reason of the tackiness of the material will adhere together. The wrapping band 7 is covered with a sheet or layer of relatively soft, uncured, rubber stock 8 which may be applied to the band 7 after the latter is in position on the drums 2 and 3 or, if desired, the cord fabric material of which the band 7 is formed may be first covered with the rubber sheet material 8 prior to being mounted on the drums.

At one side of the drum building machine A is mounted a reel B containing a continuous length of a relatively inextensible reinforcing strand indicated at 10. The strand 10, which may be a cord of cotton, linen, rayon or similar material, is carried one or more turns about a tensioning drum or pulley 11 secured on a shaft 16 supported in suitable journals not shown. Brake shoes 12, pivoted at 14, are held against a brake drum 15, also secured on shaft 16, thereby resisting rotation of the drum 11. In this manner the drum 11 serves as a tensioning device for resisting withdrawal of the reinforcing strand 10 from the reel B during the making of the belt, as will hereinafter appear.

From the drum 11 the strand 10 is carried under a guide pulley 20, journalled on a suitably supported shaft 21, and thence over an even winding guide mechanism indicated generally at C. From the guide mechanism C the reinforcing strand 10 is carried against the wrapping band comprising the cord fabric or sheet material 7 and the soft rubber sheet 8 carried by the drums 2 and 3. The even winding mechanism C is of conventional construction and operation and, if desired, may be mounted on the frame 1 of the band building machine A. It is the characteristic of the even winding mechanism C through gearing or other connection with the drive for the drum 2 to move the strand 10 axially during the rotation of the drums 2 and 3 a sufficient distance so that each successive turn or element of the strand 10 is disposed on the soft rubber sheet 8 alongside of the preceding turn or element of the reinforcing strand and in the same plane therewith.

Figure 5:
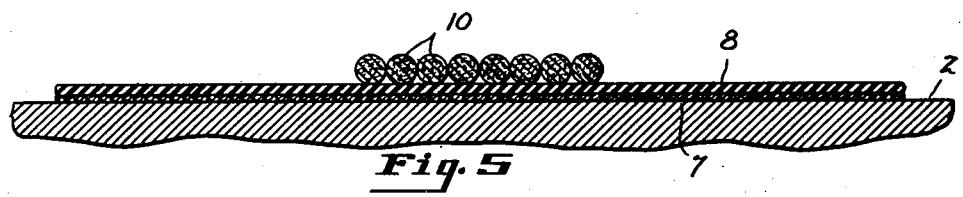
Fig. 5 is an enlarged sectional detail in diagrammatic form through one of the drums of the apparatus of the preceding figures, showing one of the first stages in the making of the belt of the present invention.

In the process of building the belt according to the present invention the strand 10, after being passed by the operator across or through the even winding mechanism C, is placed against a central portion of the soft rubber sheet 8 of the wrapping band. By reason of the tackiness of the soft rubber 8 in its uncured condition, the strand 10 may be readily adhered thereto, this operation being performed by the operator with the drums 2 and 3 stationary. The drum 2 is then rotated by means of the drive of the building machine A and the resulting movement of the wrapping band draws the reinforcing strand 10 from the reel B against the frictional restraint of the drum 11. Continued rotation of the drums 2 and 3 results in a multiplicity of turns or elements of the reinforcing strand 10 being laid up across the central portion of the belt material, the even winding mechanism C disposing the successive turns in side by side relation (Fig. 5). Thus a reinforcing means is provided which comprises a single continuous strand in the form of a helical coil, the several turns or elements of which are disposed substantially in a common plane, and are tensioned substantially an equal amount during the building process. As a result of this assembly process, the several turns of strands or tensioned elements are disposed in parallel, side by side relation with successive turns forming a surface perpendicular to the plane of the belt diameters or lying in a surface perpendicular to the plane of the belt diameters.

When a suitable number of turns or elements of the reinforcing strand 10 have been laid up on the band and drums, the latter are stopped and the strand 10 severed at a point adjacent the drum 2. The number of turns or reinforcing elements to be laid up on the drums depends upon the particular design requirements of the belt being made, and upon the strength characteristics of the material used for the reinforcing strand 10. It has been found that 6 to 10 turns are satisfactory for the average small belt and 8 turns or elements as shown in the drawings may be used successfully.

Figure 6:
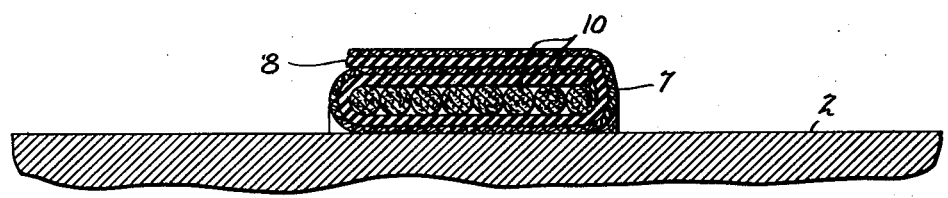
Fig. 6 is a sectional detail similar to Fig. 5 showing a succeeding step.

The turns or elements of the reinforcing strand cover only the central portion of the bias cut fabric band mounted on the drums 2 and 3. The projecting marginal portions of this fabric band are folded over one another and against the reinforcing elements or strand 10 to approximately the positions indicated in Fig. 6. Desirably the reinforcing strand is made to cover only approximately one-third of the fabric band so that, when the marginal portions of the latter are folded over one upon the other, they overlap substantially across the entire width of the reinforcing band thus formed. It is to be noted that in this reinforcing band the relatively soft rubber sheet material 8 is disposed against the turns or elements of the reinforcing strand 10 and the assembly retains itself together by reason of the tackiness of the uncured rubber of the sheet 8 and in the fabric band 7.

Lower drum 3 is then raised or moved toward upper drum 2, which relieves the tension in the wrapped reinforcing band mounted about the two drums, so that the band may be removed from the drums.

Figure 7:
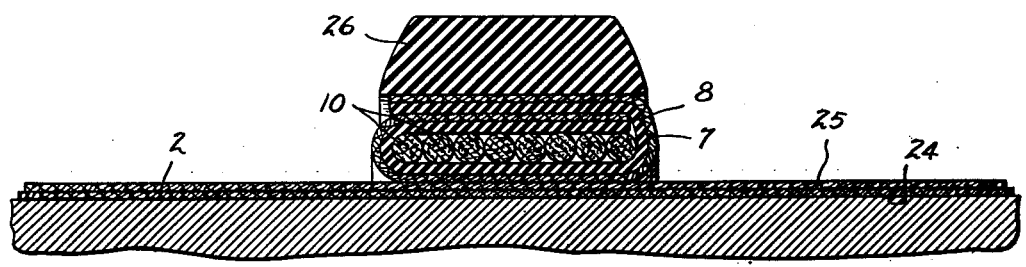
Fig. 7 is a similar sectional detail showing still another step.

With the wrapped reinforcing band off the drums 2 and 3, plies 24 and 25 of bias cut rubberized fabric material are placed or disposed about the drums in a manner similar to that described in connection with wrapping band 7. Thereafter the drum 3 is moved upwardly to slacken the plies 24 and 25, so that the wrapped reinforcing band which was previously removed from the drums and which comprises the elements of the reinforcing strand 10 and the wrapping band 7 and the rubber 8 is again placed over the drums and positioned about the central portions of the plies 24 and 25 (Fig. 7). The drum 3 is then moved downwardly to tension the plies 24 and 25, which constitute a cover band, with the wrapped reinforcing band in position. In connection with this operation it is important that in building the cover band or plies 24 and 25 of bias cut rubber impregnated or coated fabric material, the drums 2 and 3 be spaced more closely together than they are in the building of the wrapping band 7. This is for the reason that the outside circumference of the cover band must correspond to the internal circumference of the wrapped reinforcing band to permit mounting the wrapped reinforcing band on the drums over the plies 24 and 25 of the cover band in the manner just described.

A cushion 26 of relatively soft uncured rubber stock is positioned against the overlapped marginal portions of the wrapping band 7 to which it adheres by reason of the tackiness of the material. The cushion 26 is made to extend around the entire periphery of the band and may conveniently be placed while the drums 2 and 3 are rotated at a relatively slow rate of speed. In making a belt of V-type the rubber cushion 26 is preferably formed as by extrusion with a cross section of trapezoidal shape, the widest surface being disposed against the band 7.

Figure 8:
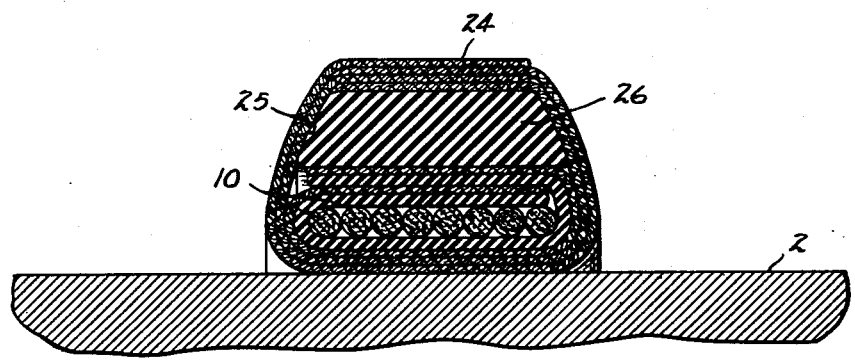
Fig. 8 is a similar sectional detail showing one of the final stages in the making of the belt of the present invention.

Marginal portions of the cover plies 24 and 25 are then folded over the outwardly directed circumferential face of the cushion stock or band 26. Preferably the marginal portions of the ply 25 are first folded and then the marginal portions of the ply 24, so that the several marginal portions are interleaved as shown in Fig. 8.

Figure 9:
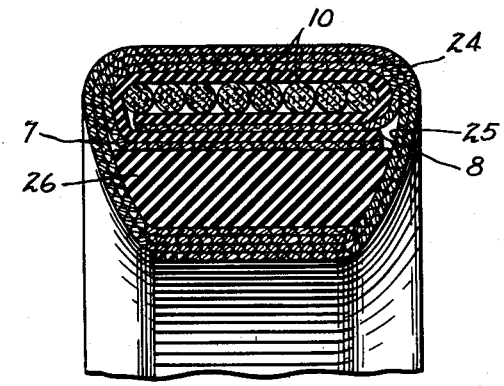
Fig. 9 is an enlarged sectional detail showing the belt as removed from the building machine and turned inside out ready for curing.

In this manner there is formed a composite annulus comprising a relatively inextensible reinforcing means wrapped in the bias cut fabric ply band 7, which constitutes an enclosing sleeve or tube for the reinforcing means. Disposed about the outer circumference of the wrapped reinforcing means or band is the relatively soft rubber annulus or cushion 26 and the whole is covered by the woven fabric material of the plies 24 and 25. This composite annulus is removed from the drums 2 and 3 by raising the latter drum, after which the annulus is turned inside out to a reverse position in which the circular cushion 26 is disposed radially inwardly of the tube or sleeve containing the relatively inextensible reinforcing means formed by the several elements of the strand 10. This reversed or turned position or state of the composite annulus is indicated in Fig. 9. By reason of the relative inextensibility of the helical reinforcing strand 10, the cushion annulus 26 is placed under compression when it is turned to the inside. Conversely the elasticity of the rubber cushion 26 now under compression exerts a force which tensions the elements of the reinforcing strand 10.

The composite annulus with the elements thereof stressed in the manner described is placed in a suitable mold for curing. Such a mold is illustrated in part in Fig. 10 and comprises an end mold section 27, intermediate mold sections 28 and rings 29. The meeting faces of the mold sections 27 and 28 are formed to define circular or annular cavities which have side walls 30 and inner peripheral walls 31. These circular cavities have the cross sectional shape of the desired V-type belt that is to be made. The mold rings 29 define outer peripheral faces 32 of the several mold cavities and the adjacent mold rings may be arranged to abut one another in end to end relation as shown. As many of the mold sections 28 may be placed together as is desired and as can be accommodated in the mold press or heater (not shown) which is to be used in the curing operation all in accordance with conventional molding practice. If desired a number of through bolts, one of which is indicated at 34, may be used to draw the mold sections together, there being another end mold section (not shown) corresponding to the end section 27.

When the composite annuluses in reversed positions and in uncured condition are first placed in the mold cavities they have the shape shown approximately by the broken lines indicated at 35 (Fig. 10), the side walls or faces being bulged outwardly. During the final closing of the mold as by tightening of the through bolts 34 the annuluses are forced or compressed into the shape desired and as indicated by the full lines of Fig. 10. Rubber being incompressible, the reinforcing means comprising the spiral or helical strand 10 is tensioned and maintained in such tensioned condition during the molding operation. Thus the belt formed by the method or process of the present invention is less subject to objectionable stretching or elongation in use than belts made by conventional methods. A conventional heater or open steam heating may be employed for curing. Upon being released from the mold, the tension in the reinforcing strand 10 maintains a slight compression in the cushion body 26, which is circumferentially embraced by the spiral strand 10. During the molding operation excess rubber may be expelled from each of the mold cavities into flash grooves 36 and 37. These grooves, which are formed in the meeting faces of the mold sections, may be circumferentially disposed adjacent to the mold cavities and are connected to one another and to the mold cavities by narrow fissures or cracks in accordance with well-known molding practice.

Figure 10:
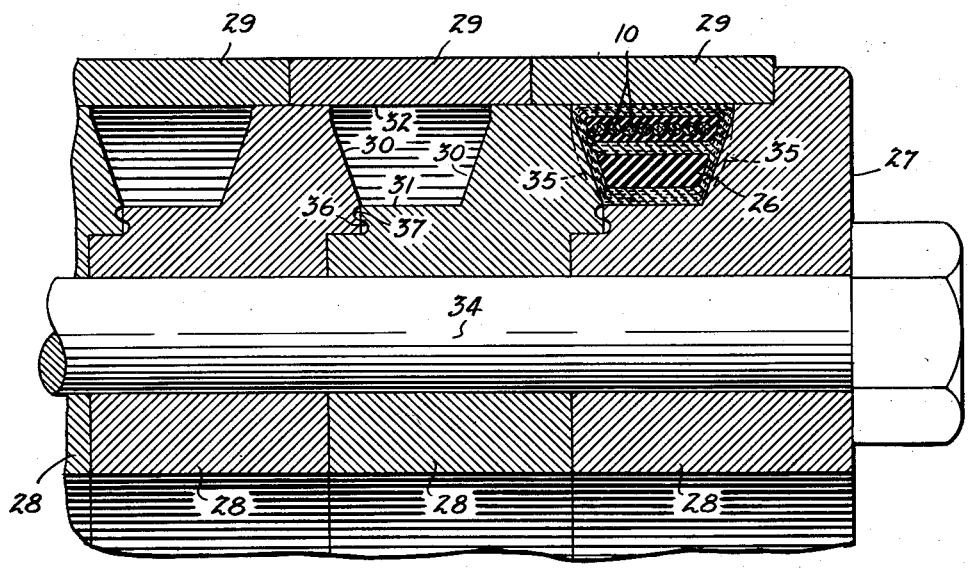
Fig. 10 is a sectional detail of a suitable multicavity mold such as may be used in curing belts made in accordance with the present invention.

Also in the curing of the belts the heat applied to the mold in accordance with conventional molding practice softens the sheet rubber 8 comprising part of the sleeve which embraces or retains the inextensible spiral strand 10, so that the relatively soft rubber flows between adjacent elements of the strand 10, substantially completely embedding the reinforcing elements in the rubber, as shown in Fig. 10. In addition the rubber impregnating the fabric bands 7, 24, and 25 is softened and flows together firmly and permanently bonding the several parts of the belt together into a substantially integral whole with the cord elements of the fabric bands and the reinforcing strand 10 so embedded as to be effectively protected against moisture, chemicals and abrasive action.

Building belts in accordance with the procedure outlined above effects substantial economy in manufacture for the reason that power machinery may be utilized in assembling the parts and in compacting the plies or bands together in forming the composite annuluses ready for curing. In the step of folding the wrapping band 7 around the spiral strand 10, suitable plows or turning devices well known in the art may be employed, although of course it is contemplated that this operation may be done by hand, if it is not desired to use turning tools or if they be not available. Similarly the bands or plies of fabric material 24 and 25 may be turned by hand or by turning tools, this turning being accomplished either while the drums 2 and 3 are stationary, rotating slowly or rotating at relatively high speed, in accordance with the skill and technique of the operator.

Figs. 11 to 17, inclusive, illustrate the making of a triangular shaped belt as distinguished from the trapezoidal shaped belt illustrated in the earlier figures of the drawing. The components of the belt illustrated in these figures are analogous to or correspond to components of the trapezoidal shaped V-belt. Similarly, the components of the mold shown in Fig. 16 are analogous to the components of the mold shown in Fig. 10. The numerals of reference used in Figs. 11 to 17, inclusive, to designate these respective parts are, with the exception of the numbers applied to the building drum, spaced by a hundred digits from the numerals used for the corresponding components of the trapezoidal shaped belt and mold used in making it.

In making the triangular shaped V-type belts, a strip of rubber-coated fabric in the uncured condition may be fed around the same drums 2 and 3 as used for forming the trapezoidal shaped V-type belts to form the wrapping band 107. The band 107 may be identical with the band 7 and is covered with a rubber sheet 108, which may be applied in the same manner as the rubber stock 8 of Figs. 5 to 10.

The inextensible reinforcing material 110 may be identical with and may be applied to the rubber sheet 108 in the same manner as the strands 10 of the earlier modification are applied to the rubber sheet 8. The number of turns of the inextensible reinforcing material 110 used depends upon the particular width desired in the belt being made and the diameter of the reinforcing strands. The reinforcing strands cover only the central portion of the fabric band and the marginal portions of this band are folded over one another and against the reinforcing elements 110, as indicated in Fig. 12. The overlap of the marginal portions of the band preferably extend substantially across the entire width of the reinforcing band thus formed. The reinforcing band is placed over the cover plies 124 and 125 in the same manner as the reinforcing band, illustrated in the earlier figures of the drawing, is placed over the plies 24 and 25.

The cushion stock 126 is of more nearly triangular shaped section than that of stock 26 of the trapezoidal form belt and is applied in form in the same manner as the cushion 26. Marginal portions of the cover plies 124 and 125 are then folded over the outwardly directed surface of the cushion stock 126. Preferably, the marginal portions of the ply 125 are first folded and then the marginal portions of the ply 124, so that the several marginal portions are interleaved, as shown in Fig. 8, to form a composite annulus. This composite annulus is removed from the drums 2 and 3 in the same manner as the annulus of the earlier figures of the drawing and reversed or turned as indicated in Fig. 15 so that an apex 101 of the triangular shaped annulus constitutes an inner periphery thereof.

The composite annulus is placed in a suitable mold, such as illustrated in Fig. 16, for curing. The mold comprises an end mold section 127, intermediate mold sections 128, and mold rings 129. The meeting faces of the mold sections 127 and 128, and the mold ring 129 are shaped to provide annular cavities which have side walls 130 and outer peripheral surfaces 132. As many mold sections 128 may be placed together as desired. Bolts 134 may be used to draw the mold sections together, there being another end mold section (not shown) corresponding to the end section 127. When the composite annulus illustrated in Fig. 15 is placed in the mold cavity, the apices of the triangle are relatively rounded. During the final closing of the mold, as by tightening of the bolts 134, the annulus is compressed into the desired triangular shape, as shown in Fig. 16. The tensioning of the reinforcing means takes place in the same manner as described with reference to Fig. 10.

After curing with a suitable heater or open steam heating, and after release from the mold, the inner peripheral apex is preferably slotted by grinding spaced, transverse slots having side walls 100, as shown in Fig. 17. The depth of the slots preferably extends from the inner peripheral apex 101 to about one-third or one-half the distance through the cushion member 126. During molding, the excess rubber may be expelled from each of the mold cavities into the flash grooves 136 which are formed in peripheral portions of the mold sections 127 and 128 adjacent the edges of the annular cavities in accordance with well-known molding practice.

Furthermore, it is to be understood that the particular form of belt and apparatus shown and described and the particular materials and procedure set forth are presented for purposes of explanation and illustration and that various modifications, substitutions and alterations are contemplated and can be made without departing from our invention as defined in the appended claims.

What we claim is:

1. A belt comprising a solid rubber annulus having an outwardly directed circumferential face, a relatively flat fabric tube of substantially greater internal width than thickness disposed against the outwardly directed face, a reinforcing means disposed in the tube and including a series of parallel elements extending circumferentially about the annulus and disposed so that the lines of centers of said element formed by cutting said belt by a single axial plane are parallel, and a fabric cover embracing the annulus, tube and elements.

2. A belt comprising a solid rubber annulus having an outwardly directed circumferential face, a relatively flat fabric tube disposed against the outwardly directed face with the greatest dimension of said tube in an axial direction, a reinforcing means disposed in the tube and including a series of parallel elements extending circumferentially about the annulus all of which lie in a single curvilinear surface generated by a line parallel to the axis about which it moves, and a fabric cover having central and edge portions, said cover being positioned with the central portion thereof overlying the tube and the edge portions lapped one over the other against the inwardly directed face of the annulus.

3. A belt comprising a rubber annulus having inwardly and outwardly directed circumferential faces, a fabric tube disposed against the outwardly directed face, a continuous helical reinforcing strand containing a multiplicity of turns disposed in the tube and extending circumferentially about the annulus, and a fabric cover embracing the annulus, tube and said helical reinforcing strand.

4. A belt comprising a rubber annulus having inwardly and outwardly directed circumferential faces, a fabric tube disposed against the outwardly directed face, a continuous reinforcing strand containing a multiplicity of turns disposed in the tube and extending circumferentially about the annulus, the adjacent turns being in side by side relation and being concentric with the outwardly directed circumferential face of said annulus, and a fabric cover embracing the annulus, tube and continuous reinforcing strand.

5. A belt comprising a rubber annulus having inwardly and outwardly directed circumferential faces, a fabric tube disposed against the outwardly directed face, a reinforcing means disposed in the tube and extending circumferentially about the annulus, said means including a series of turns of tensioned elements in parallel side by side relation with successive turns forming a surface perpendicular to the plane of the belt diameters, and cover means embracing the annulus, tube and reinforcing means.

6. A belt comprising a rubber annulus having an outwardly directed circumferential face, a reinforcing means extending circumferentially about the annulus, said means including a series of turns of tensioned elements disposed in side by side, parallel relation diameters with successive turns in a surface perpendicular to the plane of the belt, the annulus being circumferentially compressed and the elements being tensioned, a fabric tube embracing the reinforcing means and separating said tensioned elements from the annulus, and cover means embracing the annulus and said tensioned elements.

7. A continuous belt comprising a rubber annulus having inwardly and outwardly directed circumferential faces, a relatively flat fabric tube having an internal width several times the internal thickness, said tube being disposed against the outwardly directed face, a rubber cushion within the tube, a reinforcing means in the tube and including a series of turns of parallel elements embedded in the cushion and disposed so that successive turns lie in a surface perpendicular to the plane of the belt diameters and extending circumferentially about the annulus, and a fabric cover embracing the annulus, tube and elements.

8. A belt comprising a rubber annulus of a solid cured rubber compound, a fabric tube having greater internal width than thickness disposed against the annulus and reinforcing elements extending through the tube and circumferentially about the annulus, the annulus being circumferentially under compression substantially all of said elements lying in a surface perpendicular to the plane of said belt diameters and being under tension.

9. A belt comprising a solid rubber annulus, an oblong fabric tube having relatively large internal width to thickness ratio and being disposed against the outer surface of said annulus, reinforcing elements extending through the tube and circumferentially about the annulus, the annulus being circumferentially under compression and the elements being under tension, and a fabric cover embracing the annulus, tube and elements.

10. The method of making an annular reinforced rubber belt which comprises forming a rubberized fabric tube about an annular reinforcing band of substantially inextensible material, which band has a plurality of successive turns of said inextensible material in a single surface generated by a line perpendicular to the plane of said tube and which tube has great internal width relative to internal thickness, placing about the outer circumference of said tube a cushion of elastic rubber material and adhering the cushion to the band to form a composite annulus, turning the annulus inside out to reverse the relative positions of the cushion and band whereby the band is tensioned and the elastic cushion is compressed circumferentially, and curing the turned annulus while holding the same in reversed position.

11. The method of making an annular reinforced rubber belt which comprises forming an annular reinforcing band of substantially inextensible material on a strip of sheet material, folding side edges of said strip of sheet material about said reinforcing band to form a tube of rubberized fabric enclosing said annular reinforcing band, placing about the outer circumference of the tube thus formed a continuous elastic band of elastic rubber material and adhering the elastic band to the tube to form a composite annulus, covering the annulus with suitable fabric, turning the covered annulus inside out to reverse the relative positions of the elastic band and reinforcing band whereby the reinforcing band is tensioned and the elastic band is compressed circumferentially, and curing the turned annulus while holding the same in reversed position.

12. The method of making an annular reinforced rubber belt which comprises forming an annular reinforcing band of inextensible material in the form of a helical reinforcing strand, wrapping the band in rubber containing sheet material while maintaining said helix to form a flattened tube about said band, placing about the outer circumference of the wrapped band a cushion of relatively elastic rubber material and adhering the cushion to the wrapped band to form a composite annulus, turning the annulus inside out to reverse the relative positions of the cushion and wrapped band, and curing the turned annulus while holding the same in reversed position.

13. The method of making an annular reinforced rubber belt which comprises forming an annular reinforcing band of substantially inextensible material in the form of a helical reinforcing strand, wrapping the band in rubber sheet material while maintaining said helix, placing about the outer circumference of the wrapped band a continuous cushion of elastic rubber material and adhering the cushion to the wrapped band to form a composite annulus, covering the annulus with rubberized fabric, turning the covered annulus inside out to reverse the relative positions of the cushion and wrapped band, and curing the turned, cushioned annulus while holding the same in reversed position.

14. The method of making an annular reinforced rubber belt which comprises forming a band of rubber sheet material, rotating the band, feeding a substantially inextensible reinforcing strand onto the rotating band to build thereon a reinforcing band, wrapping the sheet material band about the reinforcing band, placing about the outer circumference of the wrapped band a cushion of elastic rubber material and adhering the cushion to the band to form a composite annulus, turning the annulus inside out to reverse the relative positions of the cushion and wrapped band, and curing the turned annulus while holding the same in reversed position.

15. The method of making an annular reinforced rubber belt which comprises forming a band of rubber and fabric containing sheet material, rotating the band, feeding a substantially inextensible reinforcing strand onto the rotating band and guiding the strand during a plurality of revolutions of the band to lay up a reinforcing band of a multiplicity of turns of the reinforcing strand disposed in side by side relation, wrapping the sheet material band about the reinforcing band, placing about the outer circumference of the wrapped band a continuous cushion of elastic rubber material and adhering the cushion to the wrapped band to form a composite annulus, turning the annulus inside out to reverse the relative positions of the cushion and wrapped band, and curing the turned annulus while holding the same in reversed position.

16. The method of making an annular reinforced rubber belt which comprises forming an annular reinforcing band of substantially inextensible material, wrapping the band with rubber and fabric sheet material to form a wrapped band, placing about the outer circumference of the wrapped band a cushion of elastic rubber material and adhering the cushion to the wrapped band to form a composite annulus, covering the annulus with rubberized fabric, turning the covered annulus inside out to reverse the relative positions of the cushion and wrapped band whereby the band is tensioned and the continuous elastic cushion is compressed circumferentially, compressing side portions of the turned covered annulus to increase the radial depth of the annulus, and curing the turned annulus while compressing the same and holding it in reversed position, said wrapped band having a width several times the thickness.

ROBERT R. RIEL.
RICHARD A. CLAUSSEN.

REFERENCES CITED

The following references are of record in the file of this patent:

UNITED STATES PATENTS

| Number | Name | Date |
|---|---|---|
| 1,494,075 | Murray | May 13, 1924 |
| 1,657,300 | Delzell | Jan. 24, 1928 |
| 1,906,397 | Meyer | May 2, 1933 |
| 1,924,083 | Carter et al. | Aug. 22, 1933 |
| 1,930,747 | Gerstenslager | Oct. 17, 1933 |
| 1,939,859 | Matthias | Dec. 19, 1933 |
| 1,969,067 | Freeman | Aug. 7, 1934 |
| 1,998,816 | Meyer | Apr. 23, 1935 |
| 2,255,884 | Hedgepeth | Sept. 16, 1941 |